United States Patent Office 3,211,695
Patented Oct. 12, 1965

3,211,695
COATING COMPOSITION FROM A MIXTURE OF AN EPOXY RESIN AND TWO POLYESTER RESINS
Marvin A. Peterson, Fort Wayne, Ind., assignor to General Electric Company, a corporation of New York
No Drawing. Filed Nov. 23, 1960, Ser. No. 71,146
12 Claims. (Cl. 260—40)

This invention relates to resinous insulating compositions and particularly to such compositions useful for solid dielectric and protective coverings for electrical apparatus.

In particular, electrical apparatus used in outdoor applications may be exposed to a wide range of conditions, such as rainfall, corrosive atmosphere, freezing snow and direct exposure to sunlight. The material must be capable of functioning satisfactorily when submerged in water or ice as well as when in relatively high and low humidity environments which may be encountered in various extremes of the weather. Moreover, it is essential that under all of these conditions the material be capable of maintaining a continuous and uninterrupted coverage without cracking or peeling over temperatures ranging from minus 40 degrees Fahrenheit to temperatures of 160 degrees Fahrenheit. It is also necessary that the material possess excellent impact resistance and flame resistance as required by the Underwriters' Laboratories, that the composition be compatible with magnet wire coating and that it be curable within the time and temperature limitations imposed by the components of the electrical apparatus.

The requirements for dielectric and protective weatherproof materials are very stringent and demand a combination of properties heretofore unattainable in a single composition. To possess commercially acceptable weatherproof characteristics, such a material must meet the requirements of various tests, such as impact at, as well as after prolonged exposure to, low and moderately high temperatures, ability to self extinguish after exposure to a 1700 degree Fahrenheit flame, thermal shock, water absorption and hydrolytic stability, compatibility with magnet wire enamel, outdoor weatherability, adhesion to metals and accelerated aging tests.

Heretofore, it has not been possible to satisfactorily meet all of the foregoing requirements in a single composition. In specific applications certain desired characteristics such as flame resistance have been achieved with known materials but at the sacrifice and expense of other desirable characteristics. For example, the epoxy, epoxide or ethoxyline resins, as they are variously called, which are polyether derivatives of a polyhydric organic compound, e.g., a polyhydric alcohol or phenol, containing epoxy groups, have not by themselves proven to be satisfactory materials for outdoor applications. Although they could be made to pass the requirements for humidity resistance, as determined by water absorption tests, they were unable to meet the thermal shock and flame resistance requirements for weatherproof applications. Polyester resins which comprise the reaction product of a polyhydric alcohol and a non-polymerizable or polymerizable dicarboxylic acid or anhydride either alone or in combination with other copolymerizable materials such as styrene, diallylphthalate, vinyl toluene, vinyl acetate, methyl vinyl ketone, butyl methacrylate and other reactive unsaturated monomers were not satisfactory since they failed not only to meet the thermal shock requirements but also failed the flame resistance and humidity requirements.

Mixtures of ethoxyline and polyester resins have been suggested in the past. For example, U.S. Patent No. 2,683,131, Cass, describes a composition comprising a low molecular weight polyester having an acid number of 200 and a complex ethoxyline resin. The general class of resins described in the aforementioned U.S. Patent No. 2,683,131 would not meet the flame resistance requirements as specified by the Underwriters' Laboratories. The multiplicity of exact properties desired for solid dielectric and protective coverings for electrical apparatus intended for outdoor applications imposes more stringent requirements on the chemical makeup of the curing agent used than has normally been the case in compositions of the prior art.

It is an object of the invention to provide resinous compositions suitable for use as weatherproof encapsulating material for electrical devices.

A further object of the invention is to provide a flame resistant resinous composition that is capable of withstanding thermal shock from minus 40 degrees centigrade to room temperature and that has a high impact resistance.

It is another object of the invention to provide a flame resistant resinous composition possessing improved impact resistance and humidity resistance.

A more particular object of this invention is to provide a castable resinous composition possessing the requisite characteristics of a weatherproof encapsulating material for electrical apparatus such as a transformer.

It is still a further object of the invention to provide a fluidizable resinous composition possessing the requisite characteristics of electrical insulating materials for apparatus such as the coil core field structure of a motor.

I have found that I can obtain an insulating material having significantly improved characteristics by employing a resinous composition of ingredients comprising (A) a polymerizable mixture of (1) a polymerizable linear unsaturated polyester of ingredients comprising (a) a polyhydric alcohol, (b) an adduct of hexahalocyclopentadiene and a polycarboxylic compound containing aliphatic carbon to carbon unsaturation, the halogen being selected from the group consisting of chlorine, fluorine and mixtures thereof, and (c) a polycarboxylic compound containing aliphatic carbon to carbon unsaturation, and (2) a polymerizable compound containing aliphatic carbon to carbon unsaturation, and (B) a complex epoxy resin containing epoxide groups and comprising the polyether derivative of a polyhydric organic compound selected from the class consisting of polyhydric alcohols having adjacent hydroxyl groups and phenols having at least two phenolic hydroxyl groups and (C) the reaction product of a chlorinated maleic adduct and 1,2,3-propanetriol, said adduct being present in a mole ratio with respect to a mole of said 1,2,3-propanetriol ranging from 2.1:1 to 2.5:1.

It was discovered that the use of a curing agent formed from the reaction product of the chlorinated maleic adduct and 1,2,3-propanetriol in the critical proportions set forth above enhanced the compatibility of the epoxy and the polyester resins when cured to an infusible and insoluble state.

The unsaturated linear polyesters used in the compositions of the present invention are prepared by effecting the chemical addition of a hexahalocyclopentadiene with an unsaturated polycarboxylic acid or acid anhydride or acid halide, or an unsaturated polyhydric alcohol or esters thereof to form a Diels-Alder type adduct. The adduct is esterified with a polyhydric alcohol or polycarboxylic acid to produce a soluble polyester chain containing the olefinic linkage present in the adduct. For example, the following linear polyester is formed by the esterification of adduct of hexahalocyclopentadiene with ethylene glycol:

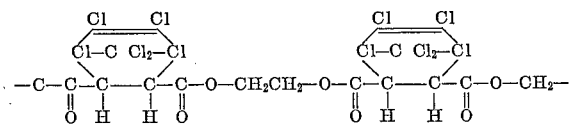

The residual double bonds in the foregoing linear polyester do not lend themselves to vinyl polymerization; however, this structure can be rendered copolymerizable with olefinic cross-linking agents such as styrene, divinyl compounds, diallyl compounds, etc., by effecting the esterification in the presence of maleic anhydride.

Thus, the unsaturated polyester used in the preparation of the composition of the invention is a condensation product of approximately equimolar amounts of glycols and polyols of the series, 1,2-ethanediol, 1,2,3-propanetriol, etc., and 1,4,5,6,7,7-hexachloro-bicyclo-(2,2,1)-5-heptene-2,3-dicarboxylic anhydride or acid and small amounts of compounds such as cis- or transbutenedioic anhydride. The acid number of these unsaturated polyester resins are low and can be neglected in the evaluation of the required concentration of curing agent. The polyesters are fully described in U.S. Patent No. 2,779,701, Robitschek et al., and by reference, the aforementioned patent is intended to be included as part of the present description of the polyester resins which can be used in the preparation of the composition of the invention.

Polymerizable mixtures of the linear unsaturated polyesters are commercially available under the trademark Hetron and are manufactured by the Hooker Electrochemical Company. The polymerizable polyester mixture Hetron 31 includes the olefinic cross-linking agent styrene and upon curing yields a styrenated polyester. Data on the Hetron resins are given in Table I.

*Table I*

| Hetron | Acid number | Physical form | Specific gravity |
|---|---|---|---|
| 17 | 30.3–30.7 | Solid | 1.6 |
| 19 | 30–38 | ___do___ | 1.6 |
| 31 | 17 | Viscosity (Gardner at 73° F.), 9–11 poises. | 1.28 |
| 32A | 13.5 | 15 poises | 1.31 |

Curing of the linear unsaturated polyester resin in the compositions of the invention is effected by the presence of well known peroxide catalysts and can be accelerated by the use of promoters, such as cobalt salt solutions. Preferably, benzoyl peroxide may be used where the curing is effected at or above a temperature of 120 degrees Fahrenheit. For room temperature curing systems methyl ethyl ketone peroxide may be used in conjunction with an organic cobalt salt solution such as a solution of cobalt naphthenate. With most of the peroxide catalysts, when the temperature is increased, the curing time required will decrease. The curing time and temperatures will also depend to some extent upon the size and configuration of resin material.

The epoxy, ethoxyline or epoxide resins, as they are variously called, which may be used in the invention comprise a polyether derivative of a polyhydric organic compound, e.g., a polyhydric alcohol or phenol, containing epoxide groups. The resins may be obtained by reacting an epihalogenohydrin, for instance, epichlorohydrin, and a phenol having at least two phenolic hydroxy groups, for example, bis-(4-hydroxyphenyl)-dimethyl-methane. These resins are more fully described in U.S. Patent No. 2,324,483, Castan; U.S. Patent No. 2,444,333, Castan; and British Patents 518,057 and 579,698. It will be noted that the epoxy resins used contain more than one ethylene oxide groups, e.g., from 1 to 2 or more epoxide groups per molecule and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, with epichlorohydrin. The resins are represented by the structural formula:

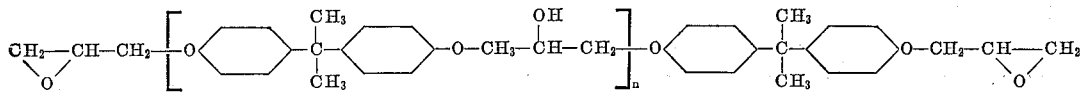

where $n$ is an integer having an average value varying from around zero to about 7. From the above structural formula, it will be seen that the epoxide groups are on the end of the polyether chain. The epoxy resins used in the invention contain epoxide groups or epoxide and hydroxyl groups as their functional groups and are generally free from other functional groups such as basic and acidic groups. The degree of polymerization of the resins is expressed in terms of epoxide equivalents. The term "epoxide equivalent" is defined as the weight of the resin in grams containing one gram equivalent weight of the epoxide group.

Examples of commercially available resins which may be used are sold under the name of Epon resins by Shell Chemical Corporation, under the name of Araldite resins by the Ciba Company, under the name of Oxiron by the Food Machinery and Chemical Company, and Epi-Rez by the Jones-Dabney Company. In general, epoxy resins having an epoxide equivalent ranging from 145 to 4000 grams may be used. Data relating to the Epon resins is presented in Table II. All the resins described in Table II, as presently available, have the structural formula of the epoxy resin given above.

*Table II*

| Epon No. | Melting point, °C. | Epoxide equivalent | OH equivalent | Molecular weight | Poises viscosity, 25° C. |
|---|---|---|---|---|---|
| 815 | Liquid | 175–195 |  |  | 5–9 |
| 820 | Liquid | 180–195 |  |  | 40–100 |
| 828 | Liquid | 180–195 | 1,250 | 358 | 100–160 |
| 834 | Liquid | 230–280 | 595 | 469 | 4.1–9.7 |
| 836 | 40–45 | 280–350 | 385 | 710 | 0.3–0.7 |
| 1001 | 65–75 | 425–550 | 312 | 900 | 1.0–1.7 |
| 1002 | 75–85 | 550–700 |  |  | 2.1–2.9 |
| 1004 | 95–105 | 875–1,025 | 294 | 1,400 | 4.6–6.6 |
| 1007 | 125–135 | 2,000–2,500 | 278 | 2,900 | 18–28 |
| 1009 | 145–155 | 2,500–4,000 | 250 | 3,750 | 38–100 |

Viscosity determinations with respect to Epons 815, 820 and 828 were made on the resin itself while solutions of the other resins were used, Epon 834 in a 70 percent by weight solution in butyl carbitol and Epons 836, 1001, 1002, 1004, 1007 and 1009 in a 40 percent by weight solution in butyl carbitol.

The epoxy resins which can be used in this invention are not limited to those described in Table II but include such resins as epoxidized polyolefins, epoxy novolaks which are essentially derivatives of phenol formaldehyde resins, and such aromatic epoxy resins of higher epoxide functionality as Epon 1310. This aromatic resin has an epoxide equivalent of 200–220, a hydroxy equivalent of approximately 825, a molecular weight of 703 and a Durran softening point of 800 degrees centigrade.

A critical feature of the present invention resides in the formulation of the curing agent for the epoxy resins used in the composition. The curing agent is prepared by reacting from 2.1 to 2.5 moles of a chlorinated maleic adduct with one mole of 1,2,3-propanetriol and is referred to herein as the reaction product of chlorendic anhydride and glycerol. It was found that quantities more or less than the specified amounts would not give the desired properties and that where such curing agents were used, the cured composition was found deficient in one or more of the following requirements, such as thermal shock resistance, impact resistance or flame resistance.

The use of a molar ratio of less than 2 to 1 moles of chlorendic anhydride to glycerol resulted in what is commonly termed a "short" polymer whereas a molar ratio of 3 to 1 moles of acid anhydride to glycerine resulted in a "hard" polymer which did not meet the stringent requirements for a weatherproof encapsulating material.

The chlorinated maleic adduct, as the term is used herein, is the adduct obtained by a Diels-Alder condensation of maleic anhydride and hexachlorocyclopentadiene. It is also known as chlorendic anhydride or hexachloroendomethylene - tetrahydrophthalic anhydride or 1,4,5,6,7,7 - hexachlorobicyclo - (2,2,1) - 5 - heptene-2,3-dicarboxylic anhydride and has the formula:

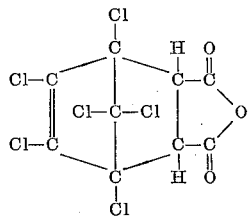

The 1,2,3-propanetriol or glycerol used in the preparation of the curing agent is a polyhydric alcohol with three hydroxyl groups per molecule and is readily available commercially.

The reaction product of chlorendic anhydride and glycerol used in the prepartion of the hereinafter described examples was prepared by charging two and four-tenths moles of chlorendic anhydride to a four-necked resin pot equipped with a Glas-Col heater, a Dean-Stark trap and condenser, nitrogen inlet, thermometer and stirrer. Upon melting, the chlorendic anhydride darkened. However, this is not deleterious, and after the melt stage had been reached, one mole of glycerol was added dropwise by means of a dropping funnel. A commercial grade of glycerol containing four percent by weight of water was used. Since the reaction between the glycerol and chlorendic anhydride is exothermic, external heating was discontinued at this point and the reaction was allowed to proceed for about an hour and a half. The reaction product is an amber brown, brittle solid. The solidified reaction product was then removed from the pot and run through a micropulverizer. The powder obtained was tan in color and had a melting point range of between 129 and 135 degrees centigrade and an acid number of 154 (±4). A microanalysis of the reaction product indicated that the following constituents were present, the amounts being given as a percent of total weight:

| | |
|---|---|
| Carbon | 29.59 |
| Hydrogen | 1.29 |
| Chlorine | 51.59 |
| Oxygen | 15.11 |
| Methoxyl | 0.14 |

If 100 percent reaction had occurred the amounts given as a percent of total weight would result in the following:

| | |
|---|---|
| Carbon | 30.09 |
| Hydrogen | 1.31 |
| Chlorine | 51.98 |
| Oxygen | 16.62 |

In the preparation of the hereinafter described formulations, the reaction product of chlorendic anhydride and glycerol was used in powdered form.

The relative proportion of the polyester component and the epoxy resin may be varied within the limits herein specified. Generally, it is preferable to use the polyester component in an amount ranging from about 30 to 45 percent of the total weight of the polyester and epoxy resin components where the composition is intended for use as a weatherproof material.

Where the composition is to be applied as a powder it was found that amounts ranging from 6 to 12 percent by weight provided satisfactory results. It will be appreciated that when a lesser amount of the polyester component is used, the epoxy components were increased in amount. For weatherproof material application it was found that the epoxy components comprising a mixture of one epoxy resin having an epoxide equivalent ranging from 175 to 350 and another epoxy resin having an epoxide equivalent ranging from 425 to 4000 may be used in amounts ranging from 16 to 27 percent. The polymerizable compound containing aliphatic carbon to carbon unsaturation, such as styrene, may be used in amounts ranging from 12 to 25 percent by weight. The reaction product of chlorendic anhydride and glycerol may be used in amounts ranging from 8 to 15 percent by weight. It will be noted that the percents given above are on a filler free basis. Generally, for encapsulating fluid bed compositions it was found that from 64 to 69 percent of the epoxy resin provided a satisfactory coating when used with from 6 to 12 percent of the polyester component and from 20 to 26 percent of the reaction product of chlorendic anhydride and glycerol.

In order to determine the flame resistance of the hereinafter described illustrative examples, as required by the Underwriters' Laboratories test specification, a specimen one-fourth of an inch thick, one-half of an inch wide and five inches long was made up of the cured material. The sample was clamped in a sheet metal test enclosure two feet in length having a cross-sectional area of one square foot. The test enclosure was open at the top and open on one long side. The test flame applied to a sample was provided for a Tirrill burner adjusted to provide a five inch 1700 degrees Fahrenheit flame with a one and one-half inch inner blue cone and mounted at an angle of 20 degrees from the vertical. The flame was applied for ten seconds and then removed.

If the specimen subjected to the flame extinguished itself within 5 seconds, the flame was again applied for a period of 10 seconds, starting 5 seconds after the end of the first application. However, if, after the first application of the flame, the specimen continued to burn longer than 5 seconds, but not longer than 10 seconds, the test flame was reapplied immediately after the specimen stopped burning. This process was repeated until each specimen was subjected to 5 ten-second applications of the test flame.

A specimen in the hereinafter described example of the composition of the present invention was considered to meet the Underwriters' Laboratories flame resistance requirement for outdoor applications if two out of three specimens tested did not continue to burn longer than 10 seconds after each of the five applications of the test flame and if there was no dripping from the specimens during any part of the test. It is readily apparent that the flame resistance requirement is much more severe than the test set forth in A.S.T.M. specification No. D635, which has been generally used to determine flame resistance.

To further demonstrate the suitability of the resinous composition of the invention for outdoor applications, low temperature impact tests were conducted in accordance with the following Underwriters' Laboratories requirements for weatherproof materials. The electrical device encapsulated with the composition was placed in a cold box at a temperature of minus 35 degrees centigrade for three hours. The cold encapsulated device was subjected to a 5 foot-pound impact. A steel ball weighing 1.18 pounds was dropped vertically a distance of 4.24 feet on the top center of the device. Further, the cold device was subjected to a pendulum impact test. A steel ball was rigged as a pendulum, which at rest, hung at the center of the side of the device. The pendulum was pulled through an arc such that the ball was 4.24 feet higher than the rest position and was released to strike the device. If the cured resinous coating on the device did not crack when subjected to both of these tests, it was considered to have met the impact strength requirements of the Underwriters' Laboratories for outdoor applications.

To determine the impact resistance of the cured compositions described in the hereinafter described examples, specimens of the cured material were also tested in a charpy impact testing machine and the results of these tests are given in foot pounds required to fracture a standard specimen. Accelerated aging test performed on the compositions of the invention involved placing specimens of the cured composition in an oven at a temperature of 158 degrees centigrade. The weight loss was determined at the end of each week for a period of eight weeks. The results of these tests are presented as the average percent loss in weight for the first week and for the eighth week based on measurements of three specimens. These tests were performed to determine the completeness of the cure, the correctness of the formulation and the possibility of degradation occurring in an application of the material.

The thermal shock test on specimens of the hereinafter described examples of compositions of the invention consisted of placing the specimen in a cold box at minus 35 degrees centigrade for a period of one hour and then removing the specimen from the cold box and allowing it to warm up to room temperature. The specimen was considered to have passed this initial test if no cracking was observed in the specimen. The initial test was then followed by placing the specimens in a cold box at a temperature of minus 42 degrees centigrade for a period of one hour and then removing the specimens from the cold box and heating the specimens to a temperature of 110 degrees centigrade. This cycle was repeated ten times. If after the tenth cycle the specimen showed no signs of cracking, it was considered to have passed the high temperature thermal shock test.

To determine the water absorption characteristics of the illustrative examples of the composition of the invention, specimens of the cured compositons were placed in distilled water at a temperature of 25 degrees centigrade for a period of 24 hours. The specimens were then removed and placed in a desiccator for a 24 hour period. The amount of water absorbed by the material was then determined and reported in the test results as the percent of the total weight of the specimen.

In order to determine whether the hereinafter illustrative examples possess suitable dielectric properties the dielectric strength of a specimen was determined. The dielectric strength was measured by increasing the potential across the thin section of a specimen at a rate of 250 volts per second and taking the root means square voltage at which a finite current flowed through the specimen. The results of the tests are expressed in volts per mill.

The nylon compatibility of the illustrative compositions were determined by coating two pieces of magnet wire which were twisted in accordance with the specification set forth in NEMA standard MW–24 and JAN-W–583. A potential was placed across the two conductors and the voltage increased at the rate of 250 volts per second until a finite current flowed through the insulation. If the wire coated with the cured composition had substantially the same dielectric strength as a twisted wire specimen that was uncoated, it was considered to have good nylon compatibility.

In order to determine whether the cured compositions of the present invention have suitable weather resistant properties, specimens of the illustrative composition were subjected to weatherometer tests. These tests consisted of exposing a specimen of the cured composition to a constant source of ultra-violet light in a 100 percent humidity chamber at a temperature of 150 degrees Fahrenheit and subjecting the specimen to a water spray for a period of 15 minutes during each hour in the chamber.

In order to indicate more specifically the advantages and capabilities of the resinous compositions of the present invention, the following specific examples are set forth by way of illustration of the invention and not in limitation thereof. The polyester Z used in the preparation of the hereinafter described examples was a chlorinated polymerizable unsaturated linear polyester obtained from the reaction product of 2.74 moles of ethylene glycol, 1.89 moles of the adduct of an equimolar mixture of hexachlorocyclopentadiene and maleic anhydride, and 0.952 mole of maleic anhydride. The epoxy resins employed are fully described in Table II and are identified in the following examples, for the sake of convenience, by their well known trade names as given in Table II. From the foregoing description of the epoxy resins, it will be seen that the trade names as used herein precisely identify the epoxy resins employed in the examples. However, it will be appreciated that the materials commercially available under these trade names may vary in composition and properties.

EXAMPLE 1

An encapsulating composition was prepared from the following ingredients which were present in the amounts indicated.

| Ingredients: | Weight in grams |
| --- | --- |
| Epon 1004 | 325 |
| Epon 828 | 325 |
| Polyester Z | 910 |
| Styrene | 520 |
| Antimony trioxide | 65 |
| Reaction product of chlorendic anhydride and glycerol | 325 |
| Benzoyl peroxide | 28.5 |
| Silica | 2300 |
| Chopped ½ inch glass fibers | 200 |

The Epon 828, polyester Z, styrene and benzoyl peroxide were added to a Baker-Perkins mixing unit and thoroughly mixed. The Epon 1004, chlorendic anhydride adduct of glycerol and the antimony trioxide were added and these ingredients were mixed. One-half of the chopped glass fiber content was then added and thoroughly mixed. At this point the mixture was observed to have a good viscous consistency. About two-thirds of the silica component was then added slowly and mixed while heat was applied to the mixture. One-fourth of the glass fiber content was added and thoroughly mixed. The remainder of the silica was then added. The remaining one-fourth portion of the chopped glass fibers was slowly added and allowed to mix for a few hours. The final mixture was found to have a homogeneous consistency, good wetting properties and was pourable. Upon being heated to 40 degrees centigrade the mixture could be rendered more fluid.

Some of the material was then cast around a shell-type transformer and liquid dielectric filled capacitor. The cast unit was placed in an oven and allowed to cure for 15 hours at a temperature between 110 and 113 degrees centigrade. The units encapsulated with the composition were placed in a cold box at a temperature of minus 35 degrees centigrade and after three hours were removed and examined for signs of cracking. This thermal shock treatment was repeated for five cycles of three hours and no cracks were observed in the material. The tensile strength ranged from 7,900 to 10,400 pounds per square inch. The modulus in tension ranged from 6.5 to $11.0 \times 10^5$ pounds per square inch and the percent elongation was found to range from 1.05 to 1.62. Charpy impact tests indicated that 0.47 pound were required to fracture a standard specimen. After one week of accelerated heat aging of a sample at 158 degrees centigrade, it was determined that the average percent loss was approximately 0.32 percent and after eight weeks of accelerated heat aging at 158 degrees centigrade the average percent loss for the eighth week was found to be 0.047 percent.

To determine the water absorption of the composition a specimen was placed in distilled water at 25 degrees for a period of 24 hours, followed by a 24-hour period in a desiccator. The percent of water absorption was found to be approximately 0.0107 percent (±0.0008). Specimens were also tested in accordance with the Underwriters' Laboratories flame resistance test and were found to pass seven cycles. The nylon compatibility was found to be excellent.

EXAMPLE 2

The formulation of Example 1 was used except that the silica content was increased from 46 percent to 49 percent and the amount of chopped glass fiber was reduced from 4 percent to 1 percent. It was found that this mixture was more viscous than the mixture of Example 1 and that heating rendered the mixture less viscous and facilitated handling. The mixture was prepared in the same manner as the mixture described in connection with Example 1. The performance characteristics of this composition is summarized in Table III below:

*Table III*

| Tests | Test results relating to composition of Example 2 |
|---|---|
| Underwriters' Laboratories flame resistance test | Passed 8 cycles. |
| Charpy impact test | 0.47 foot pound. |
| Accelerated heat aging, average percent loss at 158° C. for the first week. | 0.32 (±0.04). |
| Accelerated heat aging, average percent loss at 158° C. for the eighth week. | 0.047. |
| Nylon compatibility | Excellent. |
| Thermal shock on an imbedded hexangular steel bar (minus 35° C. to room temperature, one cycle). | Passed (no cracks). |
| Water absorption, percent by weight at 25° C | 0.0107 (±0.0008). |
| Dielectric strength, volts/mill | 440. |
| Tensile strength | 6800–9300 pounds per square inch. |
| Modulus in tension | 7.4–8.2 times 10⁵ pounds per square inch. |

EXAMPLE 3

The formulation of Example 1 was used except that the chopped glass fibers were omitted and the silica was increased from 46 to 50 percent by weight. The composition was prepared in essentially the same manner as the formulation of Example 1. When cured at a temperature of 120 degrees for 15 hours, a light brown colored material was obtained. The properties of this composition are summarized in Table IV below:

*Table IV*

| Tests conducted on Example 3 | Results of tests conducted on Example 3 |
|---|---|
| Underwriters' Laboratories flame resistance test | Passed 7 cycles. |
| Charpy impact test on specimen cured at 120° C. for 15 hours. | 0.52 foot pound. |
| Charpy impact test on specimen additionally cured for 60 days at 158° C. | 0.56 foot pound. |
| Accelerated heat aging, average percent loss at 158° C. for the first week. | 0.32 (±0.04). |
| Accelerated heat aging, average percent loss at 158° C. for the eighth week. | 0.047. |
| Nylon compatability | Excellent. |
| Thermal shock on an imbedded hexangular steel bar (minus 35° C. to room temperature, one cycle). | Passed. |
| Thermal shock (minus 42° C. to 110° C., 10 cycles). | Passed. |
| Water absorption, percent by weight at 25° C | 0.0107 (±0.0008). |

EXAMPLE 4

By way of comparison of obtainable properties the following encapsulating composition was prepared employing the Baker-Perkins mixing unit.

Ingredients: Weight in grams
- Epon 828 _____ 160
- Polyester Z _____ 112
- Styrene _____ 48
- Chlorendic anhydride _____ 160
- Benzoyl peroxide _____ 1.6
- Antimony trioxide _____ 9.6
- Silica _____ 500

Test specimens were cast by vibrating the mold and were cured at 120 degrees centigrade for 15 hours. The properties of this example are summarized in the following Table V.

*Table V*

| Tests conducted on Example 4 | Results of tests conducted on Example 4 |
|---|---|
| Underwriters' Laboratories flame resistance test | Passed 7 cycles. |
| Charpy impact test on specimen cured at 120° C. for 15 hours. | 0.23 (±0.02). |
| Charpy impact test on specimen additionally cured for 60 days at 158° C. | 0.27 foot pound. |
| Accelerated heat aging, average percent loss at 158° C. for the first week. | 0.39 (±0.03). |
| Accelerated heat aging, average percent loss at 158° C. for the eighth week. | 0.024. |
| Nylon compatibility | Failed. |
| Thermal shock on an imbedded hexangular steel bar (minus 35° C. to room temperature, one cycle). | Do. |
| Dielectric strength, volts/mill | 330–410. |

From the summary of properties set forth in Table V, it will be seen that although the formulation of Example 5 employing a chlorendic anhydride as a curing agent passed the flame resistance requirements it failed to meet the thermal shock and nylon compatibility requirements.

EXAMPLE 5

Another encapsulating composition was prepared by mixing the following ingredients in a Baker-Perkins mixing unit.

Ingredients: Weight in grams
- Epon 828 _____ 440
- Polyester Z _____ 266
- Styrene _____ 133
- Methyl Nadic anhydride _____ 50
- Chlorendic anhydride _____ 80
- Tris(dimethylaminomethyl)phenol _____ 2
- Benzoyl peroxide _____ 2
- Mica _____ 530

The resulting mixture was thixotropic. Test specimens were cast by vibrating the mold as in Example 4 and then the specimens were cured at 120 degrees centigrade for a period of 15 hours. The properties of this example are summarized in Table VI:

*Table VI*

| Tests conducted on Example 5 | Results of tests conducted on Example 5 |
|---|---|
| Underwriters' Laboratories flame resistance test. | Failed during third cycle. |
| Charpy impact test on specimen cured at 120° C. for 15 hours. | 0.15 foot pound. |
| Thermal shock on an imbedded hexangular steel bar (minus 35° C. to room temperature, one cycle). | Passed. |
| Thermal shock (minus 42° C. to 110° C.). | Failed during fifth cycle. |

Thus, the combination of polyester and epoxy resins of Example 5 wherein methyl nadic anhydride and chlorendic anhydride was employed failed both flame resistance, the (minus 42° C. to 110° C.) thermal shock and nylon compatibility tests.

EXAMPLE 6

An encapsulating composition was prepared by mixing the following ingredients in a Baker-Perkins mixing unit.

Ingredients: Weight in grams
- Epon 828 _____ 20
- Sebacic acid _____ 10
- Polyester Z _____ 42
- Benzoyl peroxide _____ 1.2
- Styrene _____ 24
- Silica _____ 66
- Mica _____ 12
- Antimony trioxide _____ 1.8

The resulting mixture was thixotropic. Test specimens were cast in the same manner as in the preceding Examples 4 and 5 by vibrating the mold. The specimens were cured at 120 degrees centigrade for a period of 15 hours. The properties of this example are summarized in Table VII:

*Table VII*

| Tests conducted on Example 6 | Results of tests conducted on Example 6 |
|---|---|
| Underwriters' Laboratories flame resistance test | Passed 6 cycles. |
| Charpy impact test on specimen cured at 120° C. for 15 hours. | 0.23 (±0.02). |
| Charpy impact test on specimen additionally cured for 60 days at 158° C. | 0.27 foot pound. |
| Accelerated heat aging average percent loss at 158° C. for the first week. | 1.69 (±0.06). |
| Accelerated heat aging average percent loss at 158° C. for the eighth week. | 0.13. |
| Nylon compatibility | Failed. |
| Thermal shock on an imbedded hexangular steel bar (minus 35° C. to room temperature, one cycle). | Passed. |
| Thermal shock (minus 42° C. to 110° C., ten cycles). | Do. |

It will be apparent from the properties summarized in Tables III, IV, V, VI, and VII that the resins using chlorendic anhydride adduct of glycerol, according to the present invention, as compared with other resins using curing agents of the prior art, have relatively higher impact resistance, lower percent losses as evidenced by accelerated heat aging tests, better nylon compatibility, lower water absorption, and better flame resistance, as shown by the Underwriters' Laboratories flame test. Although some of the desirable properties exist to some extent in the formulations of the Examples 4, 5 and 6, it will be noted, however, that only in the examples employing the chlorendic anhydride adduct of glycerol of the invention are all of the combined properties obtained in a single formulation.

EXAMPLE 7

A powdered resin composition was prepared from the following ingredients which were present in the specified percents by weights.

Ingredients: Percent by weight
- Epon 1004 _____ 42.6
- Epon 1007 _____ 24.9
- Chlorendic anhydride adduct of glycerol _ 24.9
- Polyester Z _____ 6.1
- Antimony trioxide _____ 1.4

The foregoing composition when cured possessed electrical properties which are comparable with formulations presently used in the art of the fluidized bed techniques for coating components commonly employed in the electrical industry. However, in addition to excellent fluidizability, the resin of Example 7 has the heretofore unattainable feature of flame resistance as required by the Underwriters' Laboratories. After a two hour cure at 150 degrees centigrade, it passed seven cycles of the Underwriters' Laboratories flame resistance tests. The resin has also passed taste test as required in motors employed in refrigerated appliances. When cured, the composition had a smooth glass-like ebony appearance. The powder formulation of Example 7 was employed as a fluid bed powder for coating coil core field structure of a motor.

In Table VIII I have summarized the compositions of seven Examples, Nos. 8–14, of fluidizable powder formulations (all parts by weight) which were prepared with the reaction product of chlorendic anhydride and glycerol of the invention and have also indicated therein the results of the Underwriters' Laboratories tests with respect to each example.

*Table VIII*

| Example | Epon 1007 | Epon 1004 | Reaction product of chlorendic anhydride and glycerol | Polyester Z | Antimony trioxide | Underwriters' Laboratories flame resistance test |
|---|---|---|---|---|---|---|
| 8 | 23.2 | 39.5 | 23.2 | 11.3 | 1.7 | Passed 7 cycles. |
| 9 |  | 17.0 | .80 |  |  | Passed 2 cycles. |
| 10 | 20.0 |  | 4.2 |  |  | Failed. |
| 11 | 8.2 | 14.0 | 6.6 |  |  | Passed 2 cycles. |
| 12 |  | 17.0 | 8.0 |  | 0.5 | Passed 7 cycles. |
| 13 |  | 17.0 | 8.0 | 4.0 | 0.6 | Passed 7 cycles. |
| 14 | 8.2 | 14.0 | 8.2 |  | 0.5 | Passed 5 cycles. |

The fluidizable powders of Examples 8–14 were applied to a motor coil, core field structure by means of a fluidized bed. In each instance the structure was preheated to 150 degrees centigrade, submerged in the bed and then cured two hours at 150 degrees centigrade. There resulted a smooth glass-like ebony finish in all cases. Test bars of each of the formulations were made and given the Underwriters' Laboratories flame test with the results as shown in Table VIII. It will be appreciated that the composition of this example may be applied in powdered form to the member to be coated by methods other than the fluid bed technique. The use of the reaction product of chlorendic anhydride and glycerol provides powder compositions which when cured are tough, resilient, excellent in electrical properties and pass the flame test without any dripping. It was found that the incorporation of the polyester Z further enhances both toughness and resilience of these compositions.

EXAMPLE 15

A formulation consisting of the following ingredients and amounts was prepared.

Ingredients: Weight in grams
- Epon 1004 _____ 440
- Reaction product of chlorendic anhydride and glycerol _____ 440
- Antimony trioxide _____ 88
- Silica _____ 3382
- Epon 828 _____ 440
- Polyester Z _____ 1232
- Styrene _____ 704
- Benzoyl peroxide _____ 38
- 1/16 inch chopped glass fibers _____ 136

The Epon 1004 and reaction product of the chlorendic anhydride and glycerol were all added to a Baker-Perkins mixer and mixed well. About one-half the Epon 828, the polyester Z, the styrene and benzoyl peroxide were then added and thoroughly mixed until a good fluid consistency was obtained. The other half was then added and mixed. The glass fibers were then added and final mixing was carried out under a vacuum. The composition of this example, when cured, was found to possess substantially the same properties as the formulation described in Example 1.

From the foregoing examples it is apparent that a combination of properties are obtainable in the compositions of the invention which heretofore have not been attainable in a single resinous material. The compositions are characterized by superior thermal shock resistance, flame resistance, impact resistance and high tensile strength. It is believed that these properties result from a synergistic combination of epoxy and styrenated polyester resins made possible by the use of the reaction product of chlorendic anhydride and glycerol as the curing agent and thereby introducing likeness of the linear unsaturated polyester to the epoxy chain.

Although in the illustrative examples, silica was used as a filler, it will be appreciated that the composition may be used without a filler. Preferably, where the composition is used as an encapsulating material for an electrical device, inert filler comprising silica and glass fibers in an amount ranging from 40 to 60 percent of the total weight may be used, the glass fibers comprising from 1 to 10 percent of the total weight. As is well known in the art, controlled additions of fillers will generally reduce the overall cost of the composition. Among the other fillers that may be used are calcium sulfate, various clays, aluminum oxide, titanium oxide, iron oxide, carbon, graphite, powdered metals, asbestos fibers, and mica. It was found that the addition of not more than 9 perecnt by weight of antimony trioxide improved the flame extinguishing characteristics of the composition.

The resinous compositions of this invention are suitable for use in many applications, and particularly in the electrical industry where good electrical properties, thermal shock, impact and flame resistance are essential. They may be applied as coating to coils by conventional dipping and surface coating procedures including fluidized bed techniques. Also, they may be used in preparing cast members formed by pouring the composition in a mold and curing the compositions in the mold to form any desired shape. The compositions also have utility as potting compounds for use in connection with various electrical devices.

While the present invention has been described with reference to particular embodiments and examples, it will be understood that modifications and substitutions may be made therein as will be apparent to those skilled in the art. It is, therefore, intended by the appended claims to cover all such modifications that fall within the true spirit and scope of the invention.

What I claim as new and desire to secure by Letters Patent of the United States is:

1. A composition of ingredients comprising from 30 to 45 percent by weight on a resin basis of (A) a polymerizable mixture of (1) a polymerizable unsaturated linear polyester of ingredients comprising (a) an aliphatic polyhydric alcohol having not more than four carbons in a linear chain and containing not more than two hydroxyl groups, (b) an adduct of hexahalocyclopentadiene and a polycarboxylic compound containing aliphatic carbon to carbon unsaturation, the halogen being selected from the group consisting of chlorine, fluorine and mixtures thereof, and (c) a polycarboxylic compound containing aliphatic carbon to carbon unsaturation having acidic carbonyl groups, said polycarboxylic compound having not more than four carbons and having not less than two and not more than three carboxylic acid groups, and from 12 to 25 percent of (2) styrene, and from 16 to 27 percent of (B) an epoxy resin containing about two epoxide groups per molecule and comprising a condensation product of epichlorohydrin and bisphenol, and from 8 to 15 percent of (C) a curing agent consisting of the reaction product of a chlorinated maleic adduct and 1,2,3-propanetriol, said adduct formed by the Diels-Alder reaction of maleic anhydride and hexachlorocyclopentadiene, being present in a mole ratio with respect to a mole of said 1,2,3-propanetriol ranging from 2.1:1 to 2.5:1.

2. The composition set forth in claim 1 when polymerized to an infusible and insoluble mass, said ingredient (A) having equimolar amounts of hydroxyl and carboxyl groups.

3. The composition set forth in claim 1 wherein said ingredient (a) is ethylene glycol, said ingredient (b) is an adduct of an equimolar mixture of hexachlorocyclopentadiene and maleic anhydride, said ingredient (c) is maleic anhydride, and said epoxy resin comprises a mixture of an epoxy resin having an epoxide equivalent ranging from 175 to 350 and an epoxy resin having an epoxide equivalent ranging from 425 to 4000.

4. The composition set forth in claim 1 wherein from 40 to 60 percent of the total weight is a filler comprising silica and glass fibers, said glass fibers comprising from one to ten percent by weight, said percents being based on the total weight of said composition and filler.

5. The composition set forth in claim 1 wherein said ingredient (a) is ethylene glycol, said ingredient (b) is an adduct of an equimolar mixture of hexachlorocyclopentadiene and maleic anhydride, and said ingredient (c) is maleic anhydride.

6. The composition set forth in claim 1 wherein the epoxy resin comprises a mixture of an epoxy resin having an epoxide equivalent ranging from 175 to 350 and an epoxy resin having an epoxide equivalent ranging from 425 to 4000.

7. The composition set forth in claim 1 wherein antimony trioxide is included in an amount not more than 9 percent of the total weight of said composition.

8. A transformer encapsulated with the composition set forth in claim 1 and polymerized to an infusible and insoluble mass.

9. A composition of ingredients comprising from 6 to 12 percent by weight of (A) a polymerizable mixture of (1) a polymerizable unsaturated linear polyester of ingredients comprising (a) an aliphatic polyhydric alcohol having not more than four carbons in a linear chain and containing not more than two hydroxyl groups, (b) an adduct of hexahalocyclopentadiene and a polycarboxylic compound containing aliphatic carbon to carbon unsaturation, the halogen being selected from the group consisting of chlorine, fluorine and mixtures thereof, and (c) a polycarboxylic compound containing aliphatic carbon to carbon unsaturation and having acidic carbonyl groups, said polycarboxylic compound having not more than four carbons and having not less than two and not more than three carboxylic acid groups, and from 64 to 69 percent of (B) an epoxy resin containing about two epoxide groups per molecule and comprising a condensation product of epichlorohydrin and bisphenol, and from 20 to 26 percent of (C) a reaction product of a chlorinated maleic adduct and 1,2,3-propanetriol, said adduct formed by the Diels-Alder reaction of maleic anhydride and hexachlorocyclopentadiene, being present in a mole ratio with respect to a mole of said 1,2,3-propanetriol ranging from 2.1:1 to 2.5:1.

10. The composition set forth in claim 9 wherein said ingredient (a) is ethylene glycol, said ingredient (b) is an adduct of an equimolar mixture of hexachlorocyclopentadiene and maleic anhydride and said ingredient (c) is maleic anhydride.

11. The composition set forth in claim 9 wherein antimony trioxide is included in an amount not more than 9 percent of the total weight of said composition.

12. A coil core field structure of a motor encapsulated with a composition as set forth in claim 9 and polymerized to an infusible and insoluble mass.

References Cited by the Examiner
UNITED STATES PATENTS

| | | | |
|---|---|---|---|
| 2,744,845 | 5/56 | Rudoff | 260—37 |
| 2,809,952 | 10/57 | Bolson | 260—37 |
| 2,885,380 | 5/59 | Elarde | 260—40 |
| 2,898,256 | 8/59 | Robitschek | 260—45.4 |
| 2,935,488 | 5/60 | Phillips et al. | 260—47 |
| 2,965,602 | 12/60 | Hicks | 260—45.4 |
| 3,046,851 | 7/62 | De Vries | 260—40 XR |

MORRIS LIEBMAN, *Primary Examiner.*

MILTON STERMAN, *Examiner.*